(12) United States Patent
Kim et al.

(10) Patent No.: US 6,721,058 B2
(45) Date of Patent: Apr. 13, 2004

(54) APPARATUS FOR AND METHOD OF MEASURING THICKNESS OF MATERIALS USING THE FOCAL LENGTH OF A LENSED FIBER

(75) Inventors: Duck-Young Kim, Kwangju (KR); Young Choon Yook, Jeonju (KR); Yong Woo Park, Seoul (KR); Nak Hyoun Sung, Kongju (KR)

(73) Assignee: Kwangju Institute of Science and Technology, Kwangju (KR)

( * ) Notice: Subject to any disclaimer, the term of this patent is extended or adjusted under 35 U.S.C. 154(b) by 65 days.

(21) Appl. No.: 10/080,543

(22) Filed: Feb. 25, 2002

(65) Prior Publication Data

US 2003/0038951 A1 Feb. 27, 2003

(30) Foreign Application Priority Data

Aug. 23, 2001 (KR) .................................... 10-2001-51016

(51) Int. Cl.$^7$ .............................................. G01B 11/06
(52) U.S. Cl. ...................................... 356/630; 356/632
(58) Field of Search ................................ 356/630–632, 356/479, 503; 385/33

(56) References Cited

U.S. PATENT DOCUMENTS

| | | | | | |
|---|---|---|---|---|---|
| RE29,886 | E | * | 1/1979 | Dembiak et al. | 700/196 |
| 4,995,726 | A | * | 2/1991 | Fujita et al. | 356/489 |
| 5,224,382 | A | * | 7/1993 | Karaki | 73/606 |
| 5,323,229 | A | * | 6/1994 | May et al. | 356/479 |
| 5,646,734 | A | * | 7/1997 | Venkatesh et al. | 356/632 |
| 5,850,287 | A | * | 12/1998 | Sorin et al. | 356/503 |
| 6,019,507 | A | * | 2/2000 | Takaki | 374/161 |
| 2002/0048016 | A1 | * | 4/2002 | Kim et al. | 356/73.1 |

* cited by examiner

*Primary Examiner*—Hoa Q. Pham
(74) *Attorney, Agent, or Firm*—Greenblum & Bernstein, P.L.C.

(57) ABSTRACT

The present invention provides an apparatus for measuring the thickness of a material using the focal length of a lensed fiber and an associated method. The lensed fiber generates a Gaussian Beam and moves vertically with respect to the material. The strength of the beam reflected from the material is detected when the beam emitted from the lensed fiber is focused on the material. The thickness of the material is calculated based upon the detected strength of the reflected beam.

10 Claims, 3 Drawing Sheets

APPARATUS FOR AND METHOD OF MEASURING THICKNESS OF MATERIALS USING THE FOCAL LENGTH OF A LENSED FIBER

BACKGROUND OF THE INVENTION

The present invention relates to an apparatus for measuring the thickness of materials using the focal length of a lensed fiber and a method thereof. More particularly, the invention relates to a method of measuring the thickness of materials using the strength of the beam reflected from the focal length when the beam emitted from a lensed fiber is focused on a material.

So far, many methods have been available for measuring the thickness of materials such as measuring the thickness of materials based on the analysis of interference patterns or using the height differences of materials after an etching process.

Measuring the thickness of materials based on the analysis of interference patterns is very sensitive to the external factors, thereby requiring a very stable environment in order to conduct a proper experiment. Also, the collected results should be analyzed by a suitable computer making the process unnecessarily complicated.

Measuring the thickness of materials based on an etching process is mainly used for semiconductor fabrication process. However, the process is very complex and requires highly toxic chemicals.

SUMMARY OF THE INVENTION

The present invention is designed to overcome the above problems of prior art. The object of the invention is to provide an apparatus for and method of measuring the thickness of materials using the focal length of a lensed fiber using the fact that the reflected beam from the focal length is the strongest when the beam emitted from a lensed fiber is focused on the materials.

In order to achieve the above object, the present invention provides a method of measuring the thickness of materials using the focal length of a lensed fiber through analyzing the quantity of the beam reflected from a substrate which was emitted from the end of a lensed fiber during a vertical movement of the lensed fiber. The lensed fiber here is attached to a Piezo Electric Transducer (PZT) in order to generate a Gaussian Beam (GB) and to focus the beam to a coated material on the substrate.

DETAILED DESCRIPTION OF THE EMBODIMENTS

Hereinafter, preferred embodiments of the present invention will be described in detail with reference to the accompanying drawings.

At this instance, if the surface of the material lies within the focal length of the tensed fiber then the strength of the reflected beam is at its peak. This is because the strength of the beam passing through the lensed fiber 10 progresses in the form of a Gaussian Beam. This method enables the thickness measurement of materials through an analysis of the strength of the beam reflected from the materials with several layers.

Figure 1:
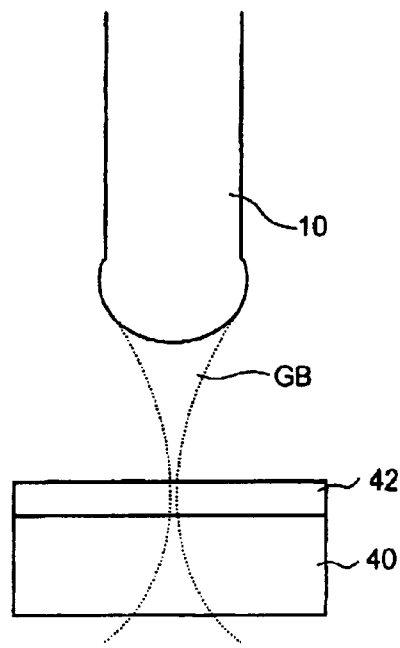
FIG. 1 is a diagram which describes the beam emitted from a lensed fiber that takes the form of a Gaussian Beam and the process of focusing the beam on a coated material.
Figure 2:
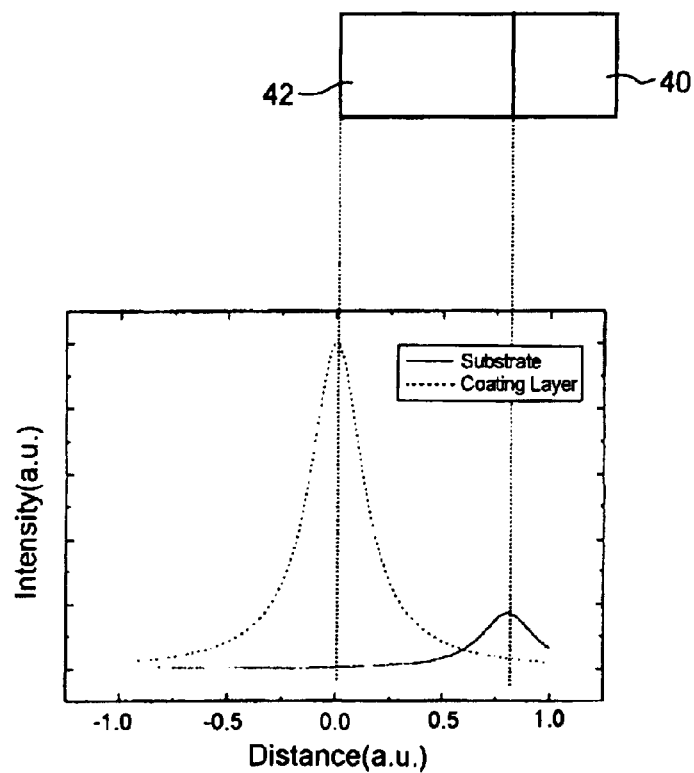
FIG. 2 is a graph which shows the strength of the beam being measured when the lensed fiber is moved vertically to the layer of the material to be measured.

FIG. 2 shows the measured beam strength when the lensed fiber is moved vertically against the layers of different materials to be measured. Each measurement represents the reflected beam strength from the first material and the second material.

Generally, the reflected beam strength from the first material is stronger than the second material. This is because the beam which passes through the first material is absorbed while progressing towards the second material and the strength of the beam becomes weaker.

If the focal length of the lensed fiber 10 becomes longer than the beam coherent length, then the interference patterns generated by the difference of beam paths can be eradicated. Therefore, if a lensed fiber 10 with a long focal length is used, then a linear variation in the beam strength, where interference patterns can be removed by moving the lensed fiber 10, can be obtained.

Figure 3:
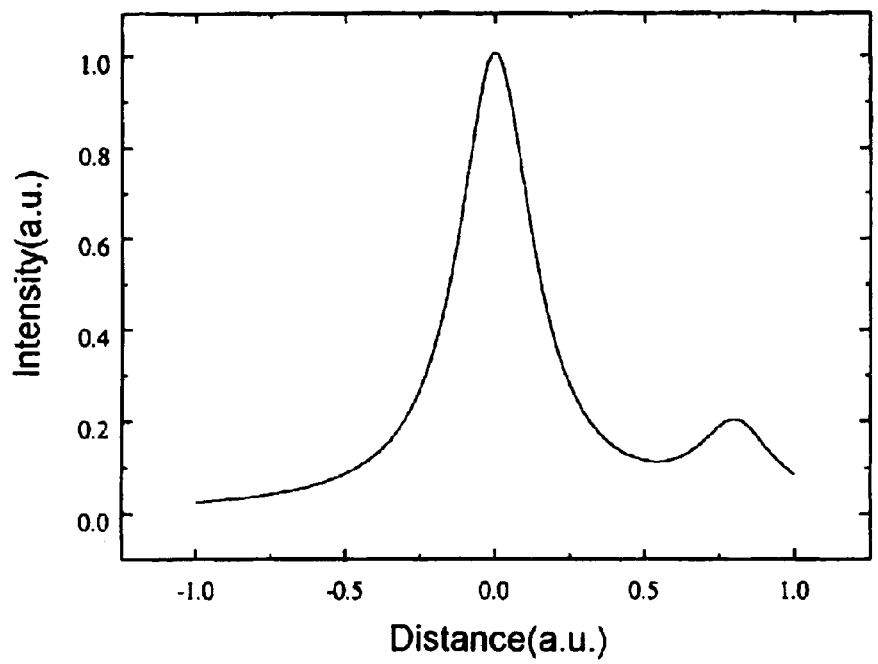
FIG. 3 is a graph which shows the beam reflected on the border between two different materials has two distinct peak values for the beam strength distribution.

As shown in FIG. 3, the beam reflected on the border between two different materials has two distinct peak values in the beam strength distribution as explained in FIG. 2. If the focal length of a lensed fiber 10 is longer than the beam coherent length of the beam used, then interference patterns generated by the difference of the beam paths can be eradicated.

If a lensed fiber 10 with a long focal length is used, then a linear variation in the beam strength, where interference patterns can be removed by moving the lensed fiber 10, can be obtained. If each of the peak values is compared with respect to the distance axis, then it is apparent that the difference between the two peak values is the thickness of the material.

Figure 4:
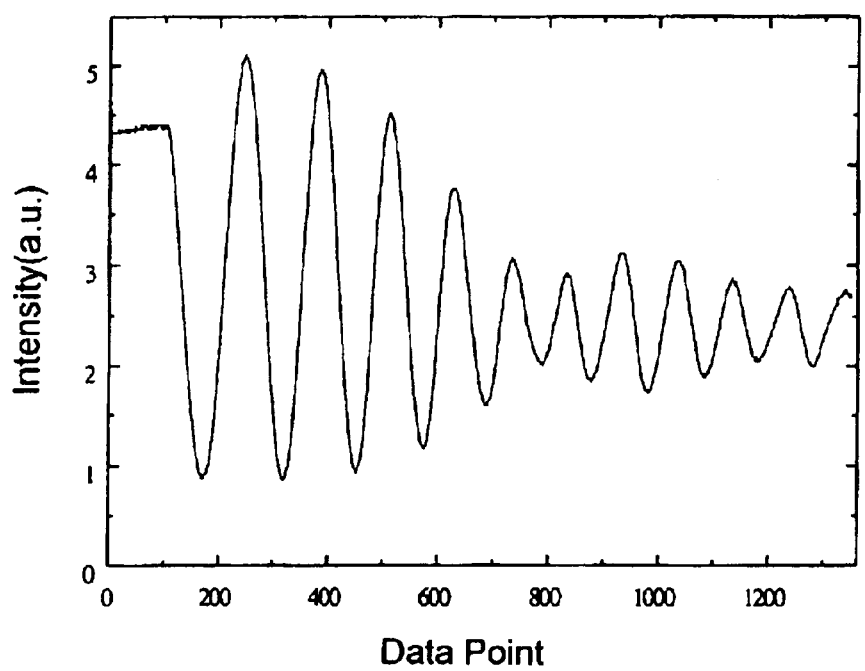
FIG. 4 is a graph which shows the variation of beam strength takes the form of interference patterns.

As shown in FIG. 4, the beam strength variation of FIG. 4 takes the form of interference patterns in FIG. 3. To be more specific, if the beam coherent length is longer than the focal length, then interference patterns appear.

Even in this case, since the information concerning the interference patterns for the reflected beam strength is available, the thickness of a material can be ascertained once the peak values are obtained. A square of the average values of interference patterns gives the first and second peak values. The difference between the first and second peak values is the thickness of the material.

The interference patterns as a whole go through the stages from large, small and large variations where they imply the same variation in the beam strength. This variation of the beam strength can be viewed as a graph which has the peak values if a squaring of the difference between the average values of interference patterns and the actual interference patterns is performed.

Also, if the material to be measured is consisted of multiple layers, the thickness of each layer can be measured from the peak value of the reflected beam for each corresponding layer.

At this instance, instead of the lensed fiber 10, a normal lens can also be used for measuring the thickness of the material.

Figure 5:
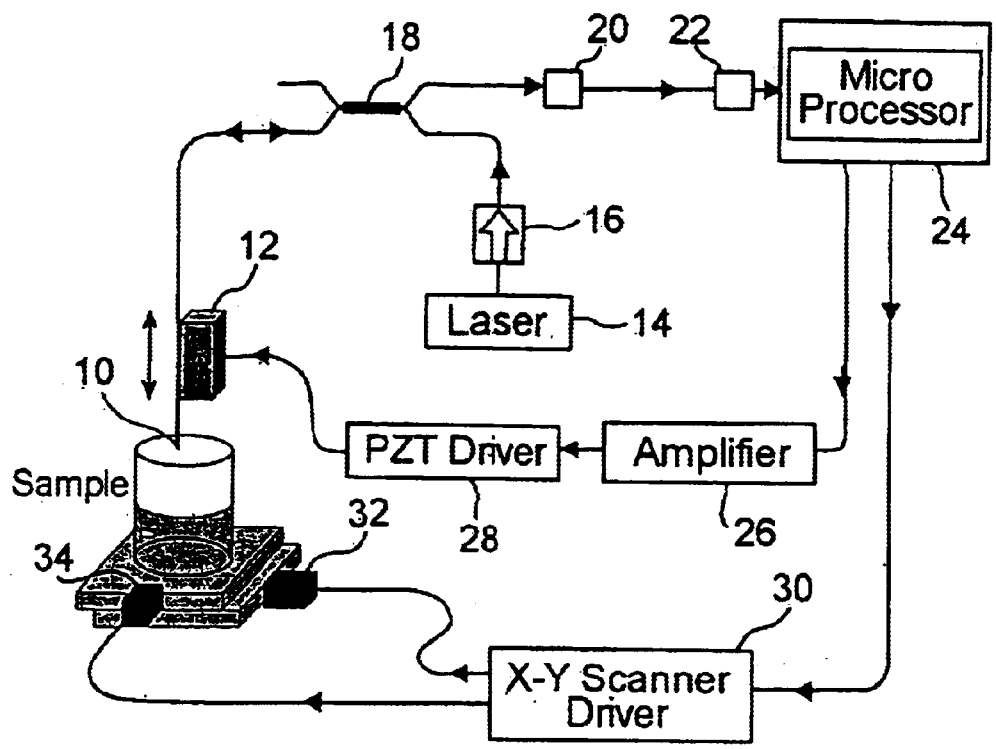
FIG. 5 shows the configuration of the apparatus for measuring the thickness of materials using the focal length of a lensed fiber.

As shown in FIG. 5, the apparatus for measuring the thickness of a material according to the present invention comprises; a Piezo Electric Transducer 12 (PZT) which moves vertically against the material to be measured; a lensed fiber 10 which is attached to said PZT for emitting a Gaussian beam; a laser 14 for emitting a beam source; a beam shutter 16 for stopping the beam output returning; a 3dB optical fiber coupler for separating the beam strength from said lensed fiber 10 and laser 14 by 50:50; a beam detector 20 for detecting reflected beam strength from the end of said lensed fiber; a RC filter 22 for filtering said detected beam; a microprocessor for analyzing said detected beam strength; an amplifier 26 for amplifying the strength of electric signals according to the control of said microprocessor 24; a PZT driver 28 for driving PZT 12 according to the strength of electric signals amplified by said amplifier 26; a X-Y axis scanner driver 30 for driving the X-Y axis scanner according to the control of said microprocessor 24; a X axis scanner 32 for driving the X axis according to the driving of the X-Y axis scanner; and a Y axis scanner 34 for driving the Y axis according to the driving of the X-Y axis scanner.

First of all, the lensed fiber 10 is attached to PZT 12 and the fiber is also moved vertically against the material to be measured. At this instance, if the quantity of the reflected beam from the end of the lensed fiber 10, which is detected by the beam detector 20, is analyzed through the microprocessor 24, then the results can be shown as FIG. 3 and FIG. 4.

If the thickness of a material to be measured is large then a linear stage that could moves as much as the thickness should be used. Also, if the material to be measured is attached to a X axis scanner 32 and Y axis scanner 34, then the thickness of the material can be measured with respect to any direction along X or Y axis.

Finally, the apparatus for and method of measuring the thickness of materials using the focal length of a lensed fiber according to the present invention, the thickness of a material can be measured by using the fact that the quantity of the beam reflected from the surface of the material is different where the beam was emitted from the end of a lensed fiber. Also, this method can be not only applied for measuring the thickness of the existing coating but also applied for measuring a material with multiple layers.

What is claimed is:

1. An apparatus for measuring the thickness of a material using the focal length of a lensed fiber comprising:
    a piezo Electric Transducer (PZT) which moves vertically against the material to be measured;
    a lensed fiber which is attached to said PZT for emitting a Gaussian beam;
    a laser for emitting a beam source;
    a beam shutter for stopping the beam output returning;
    a 3 dB optical fiber coupler for separating the beam strength from said lensed fiber and laser by 50:50;
    a beam detector for detecting reflected beam strength from the end of said lensed fiber;
    a RC filter for filtering said detected beam;
    a microprocessor for analyzing said detected beam strength;
    an amplifier for amplifying the strength of electric signals according to the control of said microprocessor;
    a PZT driver for driving PZT according to the strength of electric signals amplified by said amplifier;
    a X-Y axis scanner driver for driving a X-Y axis scanner according to the control of said microprocessor;
    a X axis scanner for driving the X axis according to the driving of the X-Y axis scanner; and
    a Y axis scanner for driving the Y axis according to the driving of the X-Y axis scanner.

2. The apparatus as claimed in claim 1, wherein the thickness of said material is measured by using a lensed fiber whose focal length is longer than the beam coherent length of the beam.

3. The apparatus as claimed in claim 2, wherein instead of the lensed fiber, a lens is used for measuring the thickness of the material.

4. The apparatus as claimed in claim 1, wherein the thickness of said material is measured by squaring of the difference between the average values of interference patterns and the actual interference.

5. The apparatus as claimed in claim 4, wherein instead of the lensed fiber, a lens is used for measuring the thickness of the material.

6. The apparatus as claimed in claim 1, wherein the thickness of the material is measured based upon the strength of the reflected beam from the surface of the material having two peak values.

7. The apparatus as claimed in claim 1, wherein if said material has multiple layers then the thickness of each layer is measured from the peak value of the reflected beam for each corresponding layer.

8. The apparatus as claimed in claim 1, wherein instead of the lensed fiber, a lens is used for measuring the thickness of the material.

9. A method for measuring a thickness of a material using a focal length of a lensed fiber, the method comprising:
    generating a Gaussian beam by transmitting light to a convex surface of the lensed fiber to focus the Gaussian beam;
    receiving the Gaussian beam reflected from the material with the lensed fiber moving vertically with respect to the material;
    detecting the reflected Gaussian beam using a detector at the lensed fiber;
    calculating a reflected Gaussian beam strength using a microprocessor; and
    measuring the thickness of the material by calculating a difference among maximal points of the reflected Gaussian beam strength.

10. The method as claimed in claim 9, wherein instead of the lensed fiber, a lens is used for measuring the thickness of the material.

* * * * *